US006472846B1

(12) United States Patent
Hutchinson et al.

(10) Patent No.: US 6,472,846 B1
(45) Date of Patent: Oct. 29, 2002

(54) POWER SOURCE

(75) Inventors: John Edward Hutchinson; Pierre Becker, both of Cape Town (ZA)

(73) Assignee: Freeplay Market Development Limited, London (GB)

( * ) Notice: Subject to any disclaimer, the term of this patent is extended or adjusted under 35 U.S.C. 154(b) by 0 days.

(21) Appl. No.: 09/831,529

(22) PCT Filed: Nov. 10, 1999

(86) PCT No.: PCT/GB99/03740

§ 371 (c)(1),
(2), (4) Date: Jul. 13, 2001

(87) PCT Pub. No.: WO00/28637

PCT Pub. Date: May 18, 2000

(30) Foreign Application Priority Data

Nov. 11, 1998 (GB) ............................................. 9824773

(51) Int. Cl.$^7$ .............................................. H01M 10/46
(52) U.S. Cl. ........................................ 320/114; 322/212
(58) Field of Search ................................ 320/101, 107, 320/114, 115, DIG. 36; 322/1, 212, 87, 88; 290/46, 49, 50

(56) References Cited

U.S. PATENT DOCUMENTS 4,360,860 A    11/1982   Johnson et al.

FOREIGN PATENT DOCUMENTS

| DE | 29520719 U1 | 4/1996 |
| GB | 2307143 | 5/1997 |
| WO | WO 97 06592 | 2/1997 |
| WO | WO 97 41699 | 11/1997 |
| WO | WO 98 42060 | 9/1998 |

*Primary Examiner*—Edward H. Tso
(74) *Attorney, Agent, or Firm*—Gibbons, Del Deo, Dolan, Griffinger & Vecchione

(57) ABSTRACT

A power system comprises a generator for generating electrical current, a rechargeable electrical storage device connectable to a load, and a source of non-electrical energy for driving the generator, the arrangement being such that energy output by the generator in excess of the power requirement of a load when connected to the battery is used to charge the battery.

11 Claims, 5 Drawing Sheets

POWER SOURCE

The present invention concerns apparatus for generating electric current. It is particularly concerned with providing a compact and reliable generator which is readily portable. Such a generator can find many fields of application one of which would be for use in providing power for portable radios, computers and other electronic equipment in environments where there is little or no provision of electrical mains.

It is of course well known to provide generators driven by peddle power. These require continuous effort in order to be operational. Additionally a radio having a removable spring-power generator has been disclosed in UK Patent Specification No 2262324. A more sophisticated form of a mechanically powered generator is disclosed in European Patent Specification No EP-A-96925832.6. As in the previous specification the main embodiment is applied to a portable radio.

The systems disclosed in these two patent specifications have a number of disadvantages. Firstly when switched off the generator is electronically braked. However this does not provide a full lock to the system and spring energy is slowly bled away through the system and lost.

A more important drawback is that a user of the system is unable to re-energise the spring, if this is the source of mechanical energy, whilst maintaining the requisite output current. Thus if the system is used in a radio and the spring winds down a user cannot re-energise the spring system and listen to the radio at the same time as winding the spring disengages any energy released to the generator and power delivery stops for the duration of the wind up.

Another disadvantage is that the energy capacity is limited to the size of the spring fitted. This provides for a limited play back period when fully charged and should extended play times be required larger heavier and more expensive springs need to be fitted. Therefore relatively large and expensive springs have to be used in order to provide acceptable play times.

Finally, the spring, gear box, and generator combination specifically disclosed in the above two specifications incurs quite heavy energy losses. The spring releases energy at a fixed rate equivalent to the maximum energy demanded by the radio, or any other load which may be applied. Energy less than that is shunted and thus wasted. Thus the spring unwind duration is the same as the play time of the radio and typically will be between 30 minutes and 1 hour. Frictional losses in the transmission are roughly constant and are not dependent on the unwind velocity so that any attempt to increase unwind time has a consequent energy penalty. From this it follows that the longer the unwind time of the spring the higher the energy content that is lost during that unwind cycle.

International Patent Specification No. WO98/42060 discloses a portable telephone set having a battery self-charging module having a manual device for driving a generator to charge a battery cell.

The present invention has as one concern to alleviate the above mentioned problems.

In accordance with the present invention there is provided a power system for supplying a variable load, the system comprising means for mounting a rechargeable battery; a mechanical generator for generating electrical power; a source of mechanical energy for driving the generator, output terminal means for connection to a load, and a control circuit for controlling the supply of electric power to the output terminal means, and wherein the mounting means and the generator are connected in parallel to an output rail, whereby output energy of said mechanical generator in excess of a load requirement is used to charge a battery mounted in said mounting means the output rail being connectable to said output terminal means by a mechanical switch which in its open position prevents conduction through the rail and by a switching transistor located between the switch and an output terminal of the output terminal means, the arrangement being such that closure of the switch enables a pulse to turn on the switching transistor to allow passage of electrical current to the output terminal, maintenance of the switching transistor in its on condition being dependent upon the output voltage supplied to the output terminal means being above a predetermined threshold.

In order that the present invention may be more readily understood an embodiment thereof will now be described by way of example and with reference to the accompanying drawings in which.

Figure 1A:
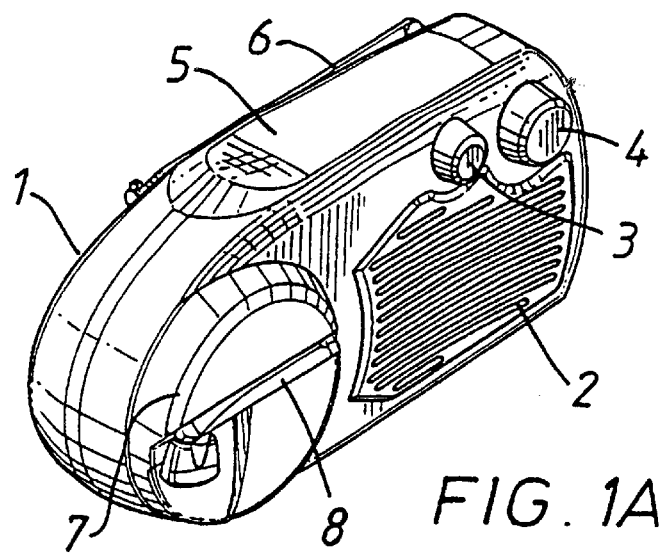
FIGS. 1A, 1B and 1C are perspective views of a radio which incorporates the present invention.
Figure 1B:
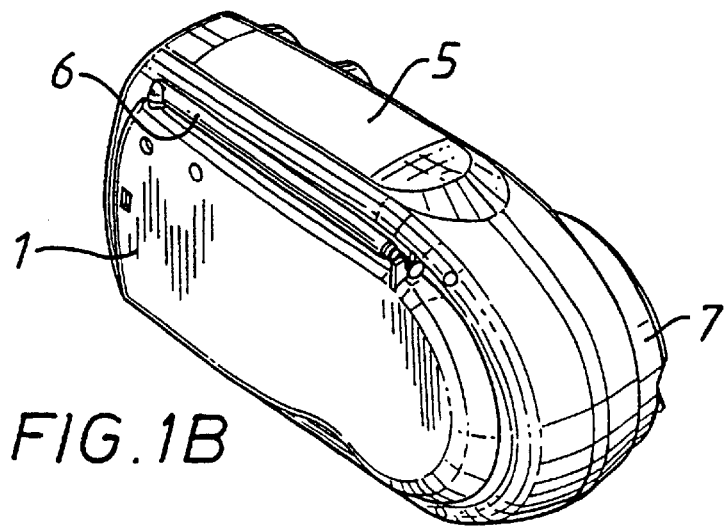
Figure 1C:
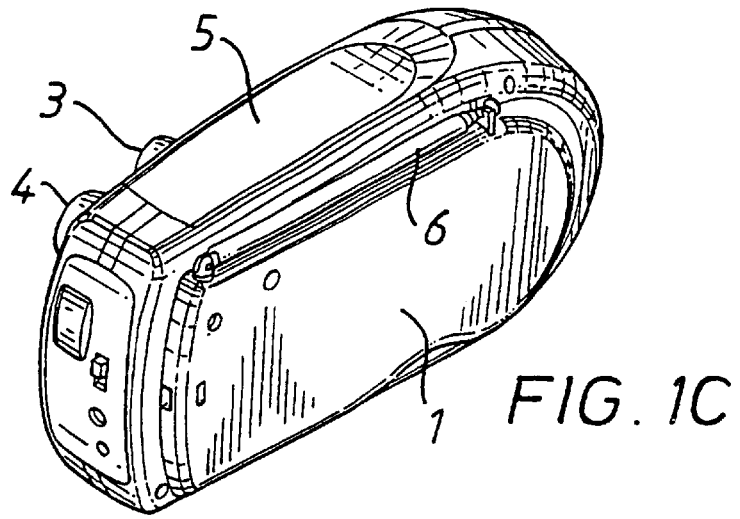

Referring now to FIG. 1 of the accompanying drawings and in particular FIG. 1A it will be seen that the radio casing 1 has a loudspeaker grill 2 and a pair of knobs 3 and 4 for controlling tuning and volume respectively. A solar panel is shown at 5 and a folding aerial at 6.

The front end of the radio is semi-circular in side view and carries a rotatable disc 7 in which is mounted a pivoted handle 8. As shown in FIG. 1A the handle is in its non-operative or retracted position but can be swung out so that a user can rotate the disc using the handle so as to wind up a powerful spring mounted within the radio. The spring and the bobbins on which it is mounted in the exploded view of FIG. 5. As will become apparent once the spring has been wound using the handle the energy stored in the spring can be used to drive a generator to provide operative current for a radio circuit shown in FIG. 2 of the accompanying drawings.

The radio shown in the accompanying drawings can be powered in three different ways, namely by spring power, from solar power generated by the solar panel and from an external power source. An embodiment of a circuit for controlling these power sources will be described hereinafter with reference to FIG. 3 of the drawings.

Figure 2:
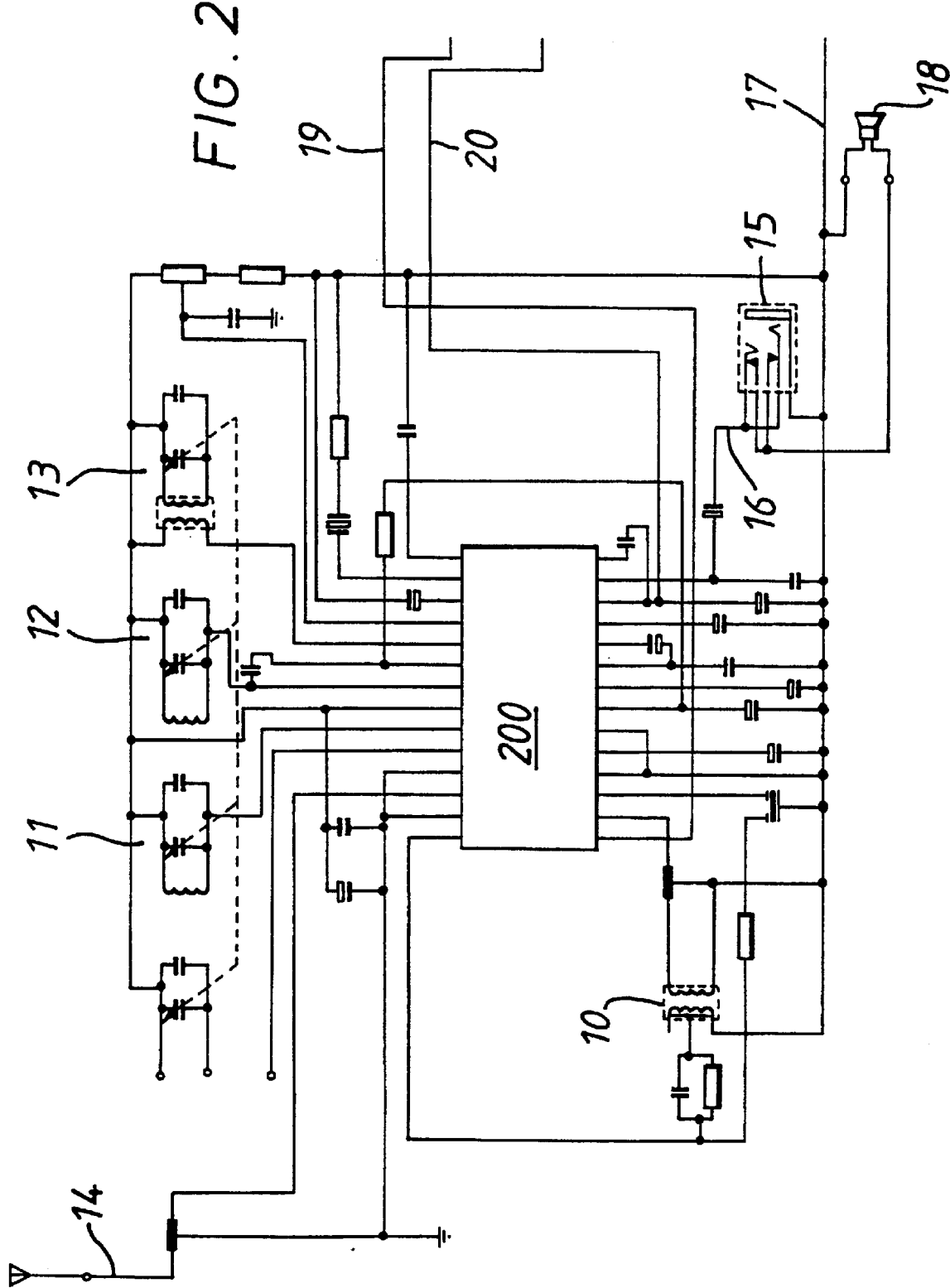
FIG. 2 is a circuit diagram of the radio receiver circuit of the radio of FIG. 1.

The radio circuit shown in FIG. 2 is essentially a custom made radio receiver chip 200. A chip particularly suited for this purpose is manufactured by Sony and is known as the Sony (RTM) CXA1691 radio receiver chip. This chip includes all the aspects of a radio receiver, voltage regulator and an audio amplifier within a single chip.

In FIG. 2 the only variable external components to the chip 200 are an intermediate frequency transformer 10, FM and AM oscillators 11, 12, 13 and antenna inputs 14.

In the present embodiment the FM coils are specified by the manufacturer but by changing the AM RF coils the band over which the radio operates can be changed from MW to SW1 to SW2 and LW.

As shown in FIG. 2 the radio circuit includes an earphone socket 15 connected to an audio output line 16 and to a negative rail 17. Negative rail 17 is also shown as the negative output rail of the power control circuit shown in FIG. 3 and which is to be described hereinafter. The earphone socket 15 is a switched socket so that when the input plug of an earphone is inserted into socket 15 the previous connection to a loudspeaker 18 is broken and the audio output is taken to the now connected earphone. As can be seen loudspeaker 18 is also connected to the negative rail 17 and to audio output line 16.

Figure 3:
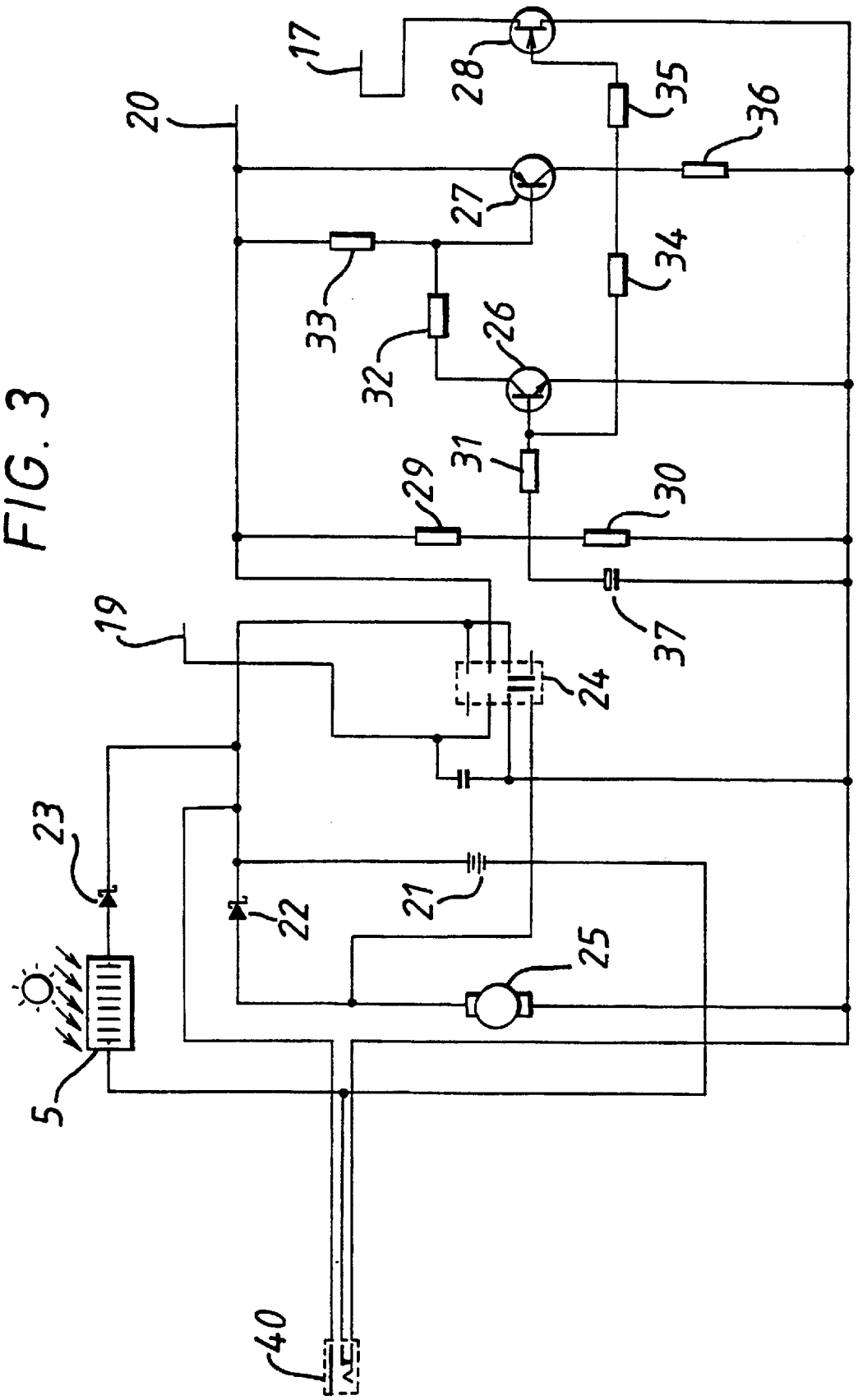
FIG. 3 is a circuit diagram of a power control circuit incorporated in the radio of FIG. 1.

Also shown in FIG. 3 is a band select input line 19 which is connected to the band select output of the power circuit of FIG. 3 and to a positive switched rail 20 which comprises the positive output from the power circuit.

Turning now to the power control circuit shown in FIG. 3 it will be seen that this also includes the positive supply rail 20 and the negative supply rail 17 by means of which power is supplied to the radio circuit.

As already described this power control circuit is designed to control the supply of power to the radio chip circuit from three possible sources, namely the solar panel 5, the generator shown at 25, a DC switched socket 40 and a rechargeable battery 21.

The purpose of the power control circuit is to avoid the disadvantages of prior circuits in which energy stored in a spring was released to a generator in response to demand so that the unwind time of the spring was equivalent to the period over which the device could be used. In the embodiment being described the primary source of energy is the battery 21 and the output of the generator 25 along with the output of the solar panel 5 is used both to energise the radio receiver chip and to charge the battery 21. Power from the generator 25 as it is driven by the unwinding spring enters the positive rail 20 via a Schottky diode 22 which prevents any reverse current flowing back to the generator. In a similar manner power from the solar panel 5 enters the positive rail 20 via a second Schottky diode 23 which fulfils the same purpose as diode 22.

When current is required for the radio chip this is switched on by means of a three position switch 24 which also serves as a band select switch for the radio circuitry, one of the switch outputs being the band select line 19 shown in FIG. 2.

As well as being connectable to the radio circuitry via the switch 24 the solar panel 5 and the generator 25 are connected to the battery 21 so that the battery can take charge when the generator 25 is unwinding. As will be described in greater detail later the generator and solar panel will normally preferentially charge the battery due to differences in resistance between the battery and the load. Thus any excess power which is generated by the generator 25 or the solar panel 5 which is not needed for the function of the radio circuit is stored in the battery 21. When the spring has unwound the power which has been stored in the battery is then used to supply the radio circuit, along with power from the solar panel 5 if there is any ambient light.

When switch 24 is switched on to connect battery 21 to positive rail 20, and once the spring powered generator 25 has wound down it is necessary to prevent battery 21 from completely discharging to 0 volts. This is achieved by the transistor switching circuit formed by transistors 26, 27 and 28 and their associated resistors 29–36. Thus the circuit provided by the transistors and resistors is essentially a low voltage cut-off circuit and in the present embodiment is arranged to isolate the battery 21 from the radio circuit when the voltage of battery 21 falls to below 1.8 volts. Thus using feedback transistors 26 and 27 switch transistor 28 off when the battery voltage falls below 1.8 volts. Naturally this voltage level, which is a preferred level for Ni-Cad batteries, can be adjusted by using other value resistors in the resistors 29–36 associated with the three transistors.

The capacitor 37 is included in the circuit to stop the "memory" typical to Ni-Cad batteries from increasing the battery voltage in a transient fashion every time the radio circuit is disconnected by the transistor switch circuit. Any increase over 1.8 volts would of course cause the transistor switch circuit to reconnect the battery 21 to the radio circuit. This would result in an oscillatory signal to the radio circuit which would in turn cause an unpleasant oscillatory sound from the loudspeaker.

As described when the radio is switched on the output from the solar panel 5 is also used to drive the radio circuit and once again if the power generated by the solar panel is in excess of the radio requirements this excess power is stored in battery 21 for future use and also charges the battery when the radio is switched off.

The socket 40 shown in FIG. 3 is a switched socket 40 adapted to receive, in the present embodiment, 4.5 volt input. Normally this DC voltage would be generated by a mains adaptor (not shown). Entry of a plug from the adaptor or another power source into socket 40 disconnects all battery charging, wind up and solar sections of the power control circuit so that the radio circuit is driven directly by the power input to socket 40 without any charging of battery 21.

It is of course possible to arrange for the battery 21 to be charged by a voltage input to socket 40.

As already mentioned the power circuit described has a number of advantages over those arrangements in which power is taken directly from the generator and lasts as long as the spring, or any other source, can provide the necessary impulse to the generator.

Figure 4:
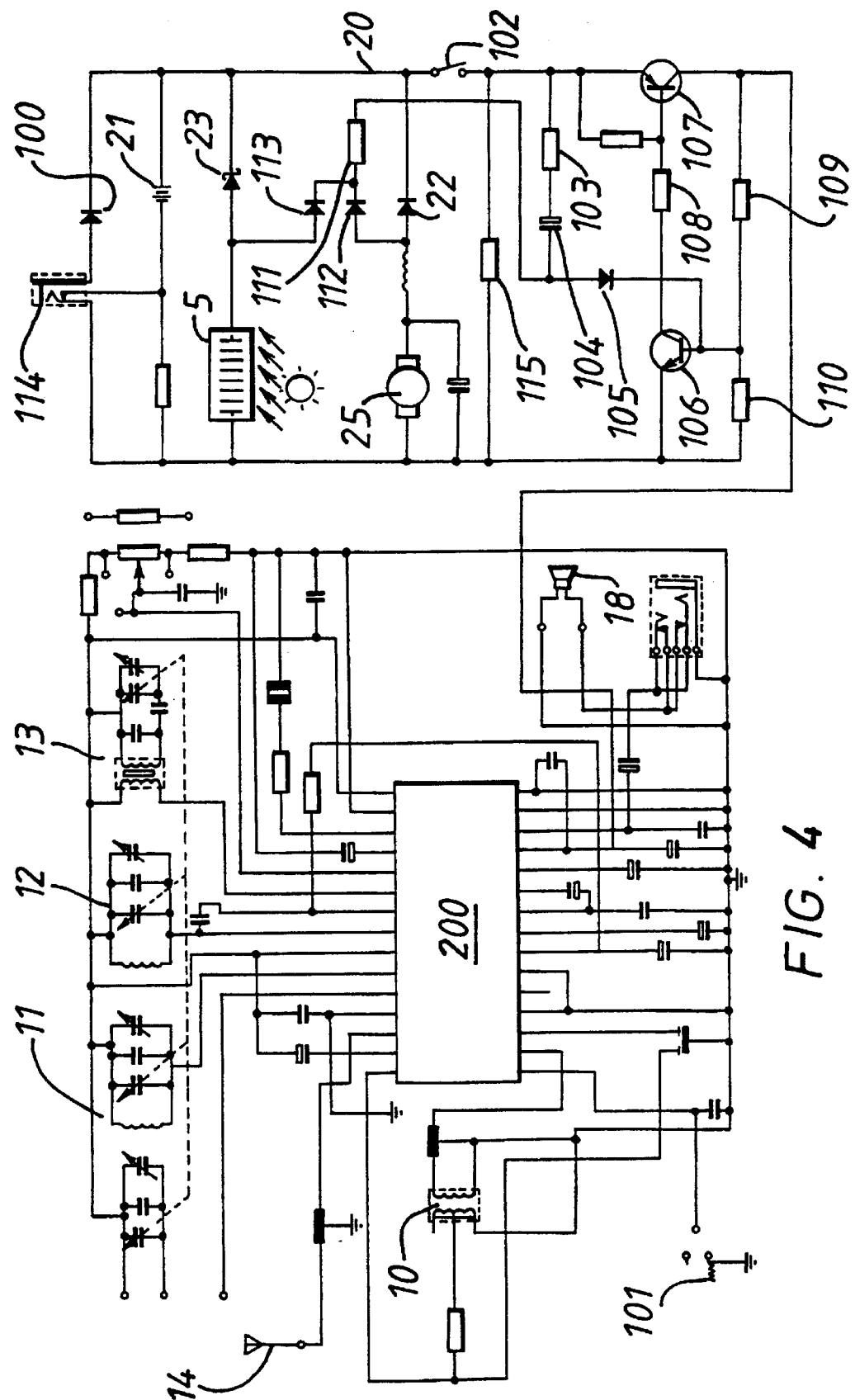
FIG. 4 is a circuit diagram of a second embodiment of a power control circuit incorporated in a radio receiver circuit which is substantially the same as the circuit of FIG. 2.

The advantages of the power supply system described in particular with respect to FIG. 3 and FIG. 4 is that batteries such as Ni-Cad batteries have a high specific energy capacity. Thus small packages have a relatively high energy content. This allows relatively long play times from a small product. Additionally as the power is effectively withdrawn from the battery rather than directly from the generator 25 power can be drawn from the system at the same time as the mechanical power source is being replenished. Thus in the case of the radio disclosed in this specification, or in the case of a computer application the radio can be played and the computer used whilst the spring is being rewound. Of course if the power source such as compressed gas was used to drive the generator a gas cylinder could be exchanged during play time without deleterious effects. The same benefit would accrue if any type of non-electrical power source would readily be exchanged for a replenished source.

Another benefit from the system described in the specification is that electrical energy delivery by the battery to the load can be done at a high rate or a low rate at equal efficiencies. In effect the spring in the present embodiment, or any other type of non-electrical power source acts as an energy buffer or an interim storage device between the human operator and the electrical generation system and the battery. This allows for a relatively large energy storage capacity in electrical form, that is the battery, but with only a relatively small spring employed. Additionally the generator and mechanical power source characteristics can be matched to the parameters of the battery and not of the load. Thus under most conditions energy can be released from the power source to the battery at a steady pace uninfluenced by the demands of the load and tailored to the most efficient transfer of energy from the non-electrical to the electrical state.

Where a spring is employed as the intermediate storage medium another advantage is that all wind input rates are acceptable so that the system can be used by children and aged people as well as adults. In particular as the spring is not the main storage mechanism it may be relatively small and inexpensive. This allows for a very easy, low torque wind compared to the wind required when the spring is used as the main storage mechanism.

Finally because energy is released from the interior power source at a constant and relatively low rate, and not at the energy input rate of a human being, a relatively small generator can be used which operates at a constant speed and allows for peak operating performance at designed parameters.

Figure 5:
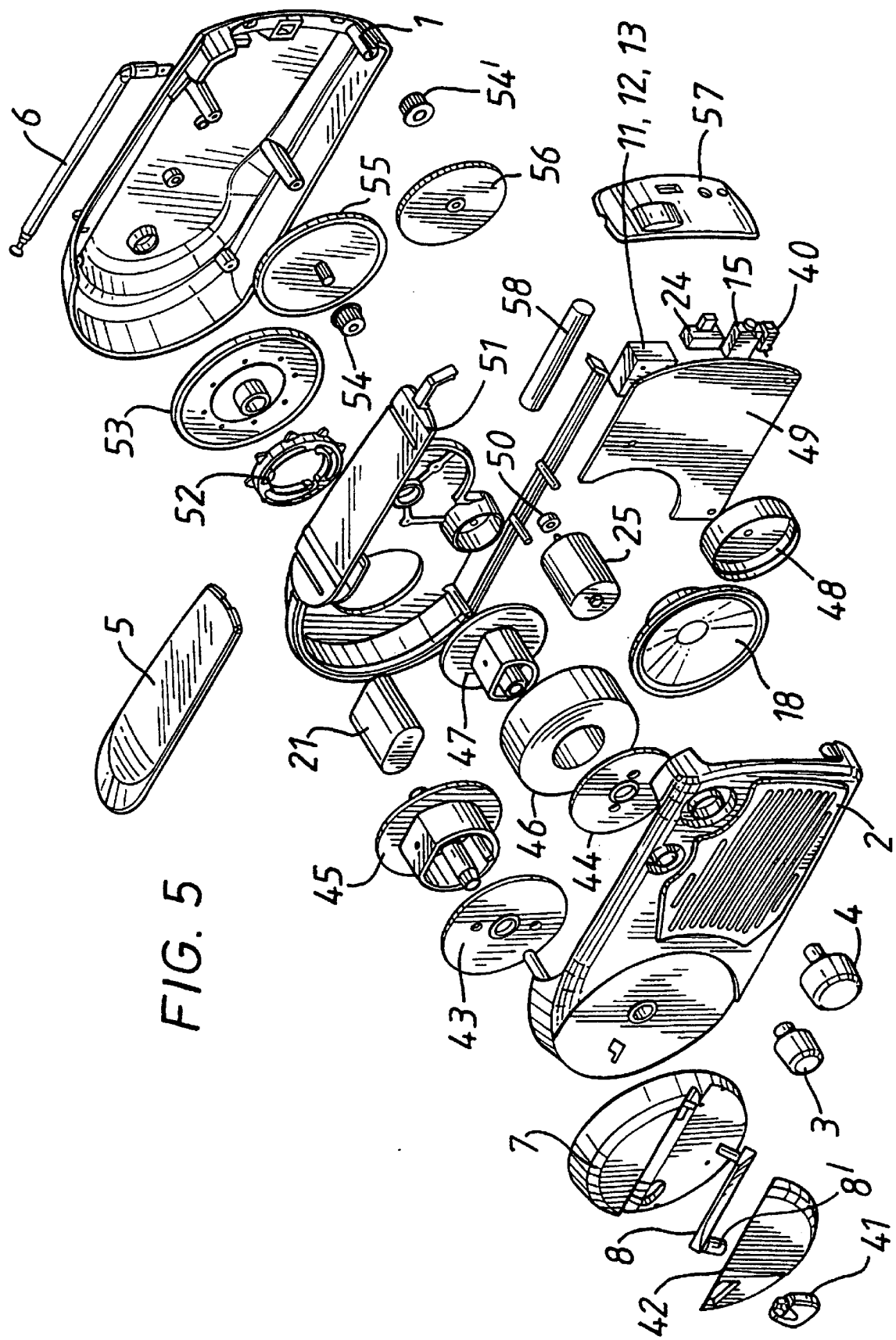
FIG. 5 is an exploded view of the radio of FIG. 1.

The embodiment of a power control circuit just described has a disadvantage that when turned off power leakage can occur via resistors 29 and 30. The power control circuit shown at 100 in FIG. 4 is both simpler and avoids this problem. An added simplification, with consequent reduction in cost, is provided by separating the channel switching function from the control circuit. Thus FIG. 5 shows channel switching by means of a switch 101 entirely separate from the control circuit 100. Other integers of FIG. 4 which are similar to those of FIGS. 2 and 3 have been given the same reference numerals.

Turning now to the power control circuit 100 this is similar to the power control circuit shown in FIG. 3 of the specification in that it is used to control the minimum discharge rate of a rechargeable nickel cadmium, nickel metal hydride or similar battery. These batteries do not normally tolerate discharge below a minimum voltage, usually +/−0.8 volts per cell.

The circuit 100 will connect power to the radio chip via a positive rail 20 switched by a mechanical power switch 102 if the battery voltage is over the minimum allowed and will cut off when the voltage drops below the preset minimum. A single positive rail is used in this embodiment as the rest of the circuitry is held at ground. When battery 21 is charged and switch 102 is closed, a pulse will be created by the switching action and will pass a pulse of current through resistor 103 and a capacitor 104. The pulse will flow through diode 105 into the base of an NPN transistor 106. This causes transistor 106 to switch on "hard" and thus connect the base of a PNP transistor 107 to ground via a resistor 108. Turning on transistor 107 causes current to flow to the radio circuit and a voltage to be generated between the emitter of transistor 107 and ground. The pulse will be short due to capacitor 104 blocking DC current to the transistor 106 but resistors 109 and 110 form a voltage divider which, if the battery voltage is high enough, will supply a constant current to the base of transistor 107 to keep it turned on.

Thus the current being constantly supplied to the base of transistor 107 is dependent on the battery voltage and the values chosen for resistors 109 and 110. When the battery voltage drops below the threshold value set by these two resistors the current to the base of transistor 107 will no longer be enough to keep it on "hard" and so will not keep the connection of the base of transistor 106 closely enough to ground to keep switched on. As transistor 106 starts switching off the voltage between resistors 109 and 110 will drop as well thus lowering the current to transistor 107 causing an avalanche effect until both transistors are completely off.

In this situation the battery 21 can be recharged while still connected, but without a trigger pulse to the base pin of transistor 106 the switch on process involving transistor 107 cannot start.

To trigger the transistor 106 a pulse can be provided in different ways.

If the generator 25 is started current will flow from the generator via a diode 112, a resistor 111 and diode 105 to the base of transistor 106. This will switch on transistor 107 but only as long as the generator 25 is functioning or the battery has a higher voltage than the threshold switch-off voltage. If the battery is flat and the generator is turned on just momentarily, the output will switch on but after a short while will switch off again. In order to ensure this resistor 111 has a relatively high value so that it passes only just enough current to pulse open the transistors 106, 107.

Alternatively if the solar panel is exposed to enough light current will flow through a diode 113, resistor 111 and diode 105 to the base of transistor 106 once again switching on the transistors 106 and 107. Transistor 107 will remain switched on only as long as the solar panel is generating sufficient current or the battery has a higher voltage than the threshold switch of voltage. Thus if the battery is flat and the solar panel is exposed just momentarily to light the output will switch on but after a short while will switch off again.

These alternative starting operations are important in dealing with the situation where a user has left the radio on and all power has run down without switch 102 being opened and means that a user can restart the ratio by charging the battery without having to first open and then close the switch 102.

To trigger transistor 106 without the help of generator 25 or solar panel 5 as previously described, for example after a full charge of the battery from an external charge connected to socket 114, it is necessary to open switch 102 which will allow capacitor 104 to discharge via resistors 103 and 115 so that when the switch is closed the closing action can generate the necessary pulse to trigger the transistors 106 and 107 into conduction.

In an environment where external power supplies are readily available to charge the rechargeable battery it will be natural for a user to take advantage of this facility as the playtime of even a relatively small battery will be considerably in excess of the playtime available from a spring-powered generator unless the generator is unfeasibly large. A typical battery capacity would require 360 to 500 milli-amp hours to charge completely and this is far beyond the capacity of a spring-powered generator of a reasonable size. Thus the battery capacity is of at least a magnitude greater than the generating capacity of spring-powered generator 25. In the present embodiment the generator/spring arrangement can generate a maximum of about 100 joules of energy. A typical rechargeable battery of a size suited to a compact radio or other device can store between 3000–4000 joules.

In an environment where there is no external recharge facility the mechanical generator is of prime importance so that any improvements in operating efficiency are valuable. Thus the following description is more concerned with the situation where the battery is not fully charged. It will be appreciated that rechargeable batteries of the nickel cadmium, nickel hydride type the resistance to charge offered by the battery varies with the degree of charge of the battery, the resistance being substantially lower where the battery is uncharged. Thus if the radio is switched on with the battery fully charged and the generator spring fully wound up the energy released by the generator will be largely wasted.

However, if the charge of the battery is low its resistance will be less than that of the load and the generator will preferentially recharge the battery. As this recharging is basically independent of the load being drawn the spring can drive the generator at its optimum rate thus substantially reducing the mechanical losses which have already been referred to. Thus the arrangement of the battery and generator in parallel to the positive supply rail as shown in the circuits of FIG. 3 and FIG. 4 is particularly beneficial when the system is used with a discharged battery as the spring will be able to unwind to drive the generator at a rate essentially independent of the load with a subsequent reduction in mechanical losses. Whereas in previous clock-work powered devices such as those described in UK Patent Specification No. 2262324 where the spring may be unwinding for about half an hour in the present embodiment while the spring-powered generator unwinds at an optimum rate the unwinding period can be under 10 minutes but will provide a play period substantially in excess of this. For example the play time in the present embodiment using the spring generators is substantially the same as in the radio disclosed in EP-A-96925832.6 but this playtime is achieved with a spring which has only 4000 of the energy storage capacity of the earlier model.

Turning now to FIG. 5 of the accompanying drawings which shows an exploded view of the radio of FIG. 1.

In FIG. 5 of the accompanying drawings images of the radio which are common to the embodiment shown in FIG. 1 in the previous figures have been given the same reference numerals. In FIG. 4 the rotatable disc and its pivoted handle 8 are shown in greater detail. Thus the handle 8 carries on a cylindrical stub 8' a winder knob 41 which can rotate about the stub when the disc is being wound. A semicircular winder cap 42 is fitted over one half of the disc 7.

Reference has already been made to the presence of a powerful spring within the radio. This spring is shown in FIG. 4 at 46. Whilst shown as a single coil in the figure it normally extends between a torque bobbin 45 and a storage bobbin 47. The torque bobbin 45 has an end cap 43 and the storage bobbin 47 has an end cap 44 with the spring 46 being confined within the bobbins and their associated end caps. Torque bobbin 45 has a central spindle which passes through an opening in its end cap to engage the disc 7 so that when the disc is rotated by the handle 8 the spring 46 can be wound up.

The torque bobbin 45 cooperates with a ratchet ring 52 suitably secured to an input gear 53 having a toothed outer rim which cooperates with a pinion gear 54 secured to a secondary gear 55 the toothed perimeter of which survives a second pinion gear 54' secured to a drive pulley 56. Drive pulley 56 is connected via a flexible belt (not shown) to a generator pulley 50 secured to the shaft of the generator 25. In this manner power from the unwinding of spring 46 can be transmitted via the gear train to the generator 25.

The torque and storage bobbins and the various gears and pinions are effectively mounted on a gear plate shown at 51.

Other components of the radio shown in FIG. 4 comprise a dial window 57 through which a dial drum 48 can be viewed, the dial drum carrying indicia showing the station to which the radio is tuned. Finally 58 shows a ferrite bar used for AM reception.

It will be appreciated that the foregoing description has concentrated on a power system in combination with a device which utilises the power generated by the power source. It is of course perfectly possible for the power source, integers, namely the generator, the solar panel, the battery and the intermediate non-electrical power source to be entirely separate from its intended load and may in fact be designed to be used with a plurality of different loads such as computers, printers, play stations and the like. It will also be appreciated that the basic concept described is not dependent on the use of a solar panel and that this element may be omitted.

What is claimed is:

1. A power system for supplying a variable load, the system comprising:

means for mounting a rechargeable battery;

a mechanical generator for generating electrical power;

a source of mechanical energy for driving the generator, output rails (17, 20) for connection to a load, and a control circuit for controlling the supply of electric power to the output rails, and characterized in that the mounting means and the generator are connected in parallel to one output rail, whereby output energy of said mechanical generator in excess of a load requirement is used to charge a battery mounted in said mounting means, said one output rail being connectable to said output terminal means by a mechanical switch which in its open position prevents conduction through the rail and by a switching transistor located between the switch and an output terminal of the output terminal means, the arrangement being such that closure of the switch enables a pulse to turn on the switching transistor to allow passage of electrical current to the output terminal, maintenance of the switching transistor in its on condition being dependent upon the output voltage supplied to the output terminal means being above a predetermined threshold.

2. A system according to claim 1, wherein closure of said switch enables a pulse of current to turn on the base of a second transistor an output of which is connected to the switching transistor to turn the switching transistor on.

3. A system according to claim 2, wherein a voltage divider across the output of the battery and generator is connected to the base of the switching transistor so as to set the threshold beneath which the switching transistor will not conduct.

4. A system according to claim 3, and including an output path leading from said generator to the base of the second transistor so that a pulse from said generator can cause the second transistor to turn the power switching transistor on.

5. A system according to claim 4, wherein said path includes a resistor the value of which is such that any output from the generator is only sufficient to turn on the second transistor.

6. A system according to claim 1, and including a solar panel (5) in parallel with the generator and the battery mounting means.

7. A system according to claim 6, wherein the outputs of the generator and the solar panel are connected to the battery mounting by respective diodes to prevent back current from the battery and solar panel.

8. A system according to claim 1, and including a nickel-cadmium or nickel-hydride battery the capacity of which is substantially greater than the amount of electrical energy which can be generated by said generator and mechanical power source.

9. A system according to claim 8, wherein the capacity of the battery is between 3000 and 4000 joules and the total energy capacity of the mechanical power source is between 80 and 120 joules.

10. A system according to claim 1, wherein the mechanical power source is a spring; and
   wherein the power source mounted in a removable cassette which is removable from the system so that power can be withdrawn from the battery by a load connected to the battery in the absence of the power source.

11. A system according to claim 1, and including a socket through which electrical power can be input from an external source; and
   wherein use of the socket causes the generator and the electrical power storage device to be disconnected from a load so that a load can be driven directly by power input through the socket; and
   wherein power from the socket can be used to charge the battery when mounted.

* * * * *